US011356915B2

(12) United States Patent
Kim

(10) Patent No.: US 11,356,915 B2
(45) Date of Patent: Jun. 7, 2022

(54) METHOD FOR TRANSMITTING/RECEIVING IMS VOICE SUPPORT-RELATED SIGNAL BY NG-RAN IN WIRELESS COMMUNICATION SYSTEM, AND APPARATUS THEREFOR

(71) Applicant: LG Electronics Inc., Seoul (KR)

(72) Inventor: Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/648,517

(22) PCT Filed: Sep. 27, 2018

(86) PCT No.: PCT/KR2018/011387
§ 371 (c)(1),
(2) Date: Mar. 18, 2020

(87) PCT Pub. No.: WO2019/059740
PCT Pub. Date: Mar. 28, 2019

(65) Prior Publication Data
US 2020/0288367 A1  Sep. 10, 2020

Related U.S. Application Data

(60) Provisional application No. 62/688,407, filed on Jun. 22, 2018, provisional application No. 62/562,510, filed on Sep. 25, 2017.

(51) Int. Cl.
*H04W 36/14* (2009.01)
*H04W 8/22* (2009.01)
H04W 36/36 (2009.01)

(52) U.S. Cl.
CPC ............ *H04W 36/14* (2013.01); *H04W 8/22* (2013.01); *H04W 36/36* (2013.01)

(58) Field of Classification Search
CPC . H04W 36/0022; H04W 36/04; H04W 36/14; H04W 36/30; H04W 88/08; H04L 65/1083; H04L 65/1016; H04L 65/1063
See application file for complete search history.

(56) References Cited

U.S. PATENT DOCUMENTS

2014/0321428 A1  10/2014  Godin et al.
2018/0092085 A1*  3/2018  Shaheen ............... H04W 36/14
(Continued)

FOREIGN PATENT DOCUMENTS

| CN | 103229546 | 7/2013 |
| CN | 103313348 | 9/2013 |
| CN | 103634864 | 3/2014 |

OTHER PUBLICATIONS

3rd Generation Partnership Project, Technical Specification Group Services and System Aspects, "Procedures for the 5G System, Stage 2 (Release 15)," 3GPP TS 23.502, V1.2.0, dated Sep. 2017, 165 pages, XP051337115.

(Continued)

Primary Examiner — Dai Phuong
(74) Attorney, Agent, or Firm — Fish & Richardson P.C.

(57) ABSTRACT

An embodiment of the present invention relates to a method for transmitting/receiving an IP multimedia subsystem (IMS) voice support-related signal by a next generation-radio access network (NG-RAN) in a wireless communication system, the method comprising the steps of: receiving, by the NG-RAN, a request associated with a UE capability for IMS voice from an AMF; checking, by the NG-RAN, whether the UE capability matches network configurations; and transmitting, by the NG-RAN, a response including the result of the check to the AMF, wherein the network configurations include a network configuration for the NG-RAN and a network configuration for a network node which (Continued)

enables IMS voice even when the NG-RAN does not support IMS voice.

13 Claims, 9 Drawing Sheets

(56) References Cited

U.S. PATENT DOCUMENTS

| | | | | |
|---|---|---|---|---|
| 2019/0090165 | A1* | 3/2019 | Huang-Fu | H04L 65/1063 |
| 2019/0297538 | A1* | 9/2019 | Keller | H04W 36/0022 |
| 2020/0015128 | A1* | 1/2020 | Stojanovski | H04W 36/0022 |
| 2021/0029618 | A1* | 1/2021 | Jain | H04W 48/16 |

OTHER PUBLICATIONS

EP Extended European Search Report in European Appln. No. 18858359.5, dated Mar. 25, 2021, 15 pages.

LG Electronics, "TS 23.501: Editorial update (NOTE numbering, non-breaking space, Style, etc.)," S2-176825, SA WG2 Meeting #122E e-meeting, 2017, Elbonia, dated Sep. 11015, 2017, 60 pages, XP051349435.

Qualcomm Incorporated, "Radio Capability Check (P-CR 38.413)," R3-172752, 3GPP TSG-RAN WG3 #97 Meeting, Berlin, Germany, dated Aug. 21-25, 2017, 3 pages, XP051319598.

Qualcomm Incorporated, "TS 23.501: Framework for UE radio related Information handling," S2-175029, SA WG2 Meeting #S2-122, San Jose Dei Cabo, Mexico, dated Jun. 26-30, 2017, 3 pages, XP051310043.

Samsung, "Voice support match indicator for TDD/FDD cells," S2-122752, 3GPP TSG-SA WG2 Meeting #92, Barcelona, Spain, dated Jul. 8-13, 2012, 3 pages, XP050633280.

CN Office Action in Chinese Appln. No. 201880062017.6, dated Jul. 5, 2021.

Office Action in Chinese Appln. No. 201880062017.6, dated Sep. 28, 2021, 6 pages (with English translation).

* cited by examiner

METHOD FOR TRANSMITTING/RECEIVING IMS VOICE SUPPORT-RELATED SIGNAL BY NG-RAN IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2018/011387, filed on Sep. 27, 2018, which claims the benefit of U.S. Provisional Application No. 62/688,407, filed on Jun. 22, 2018, and U.S. Provisional Application No. 62/562,510, filed on Sep. 25, 2017. The disclosures of the prior applications are incorporated by reference in their entirety.

TECHNICAL FIELD

The present disclosure relates to a wireless communication system, and more particularly, to a method by which a next generation radio access network (NG-RAN) transmits and receives a signal for support of Internet protocol (IP) multimedia subsystem (IMS) voice and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

The object of the present disclosure is to provide a method by which an NG-RAN checks UE capability and network configurations regarding the continuity of IMS voice.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solution

In an aspect of the present disclosure, provided is a method of transmitting and receiving, by a next generation radio access network (NG-RAN), a signal for support of Internet protocol (IP) multimedia subsystem (IMS) voice in a wireless communication system. The method may include: receiving, by the NG-RAN, a request for capability of a user equipment (UE) related to the IMS voice from an access and mobility management function (AMF); checking, by the NG-RAN, whether the capability of the UE is compatible with a network configuration; and transmitting, by the NG-RAN, a response including a result of the checking to the AMF. The network configuration may include a network configuration of the NG-RAN and a network configuration of a network node capable of the IMS voice even though the NG-RAN does not support the IMS voice.

In another aspect of the present disclosure, provided is an NG-RAN device for transmitting and receiving a signal for support of IMS voice in a wireless communication system. The NG-RAN device may include a transceiver and a processor. The processor may be configured to: control the transceiver to receive a request for capability of a UE related to the IMS voice from an AMF; check whether the capability of the UE is compatible with a network configuration; and control the transceiver to transmit a response including a result of the checking to the AMF. The network configuration may include a network configuration of the NG-RAN and a network configuration of a network node capable of the IMS voice even though the NG-RAN does not support the IMS voice.

In a further aspect of the present disclosure, provided is an AMF device for transmitting and receiving a signal for support of IMS voice in a wireless communication system. The AMF device may include a transceiver and a processor. The processor may be configured to: control the transceiver to transmit a request for capability of a UE related to the IMS voice to an NG-RAN; and control the transceiver to receive, from the NG-RAN, a response including a result of checking whether the capability of the UE is compatible with a network configuration. The network configuration may include a network configuration of the NG-RAN and a network configuration of a network node capable of the IMS voice even though the NG-RAN does not support the IMS voice.

Even though the NG-RAN does not support the IMS voice, the IMS voice may be enabled as follows: when there is a voice call for the UE, the UE is handed over or redirected to an evolved packet system (EPS) so that the UE uses the IMS voice.

The network node capable of the IMS voice may be a network node available as an EPS fallback target.

The network node available as the EPS fallback target may be an evolved Node B (eNB).

The NG-RAN may be configured to support EPS fallback for the IMS voice.

Even though the NG-RAN does not support the IMS voice, the IMS voice may be enabled as follows: when there is a voice call for the UE, the UE is handed over or redirected to an NG-RAN supporting the IMS voice so that the UE uses the IMS voice.

The network node capable of the IMS voice may be a network node available as a radio access technology (RAT) fallback target.

The network node available as the RAT fallback target may be a next generation evolved node B (ng-eNB).

The NG-RAN may be configured to support RAT fallback for the IMS voice.

The request for the capability of the UE related to the IMS voice may include information on a registration area.

The NG-RAN may obtain the network configuration of the network node capable of the IMS voice even though the NG-RAN does not support the IMS voice in one of the following ways: the network configuration is configured in the NG-RAN; the NG-RAN obtains the network configuration while setting up an interface with the network node; and the NG-RAN obtains the network configuration by sending a request for the network configuration to the network node.

Advantageous Effects

According to the present disclosure, not only a problem that an NG-RAN does not check the IMS voice related capability of a UE and a problem that whether voice support matches is incorrectly informed but also many other problems caused thereby may be solved.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
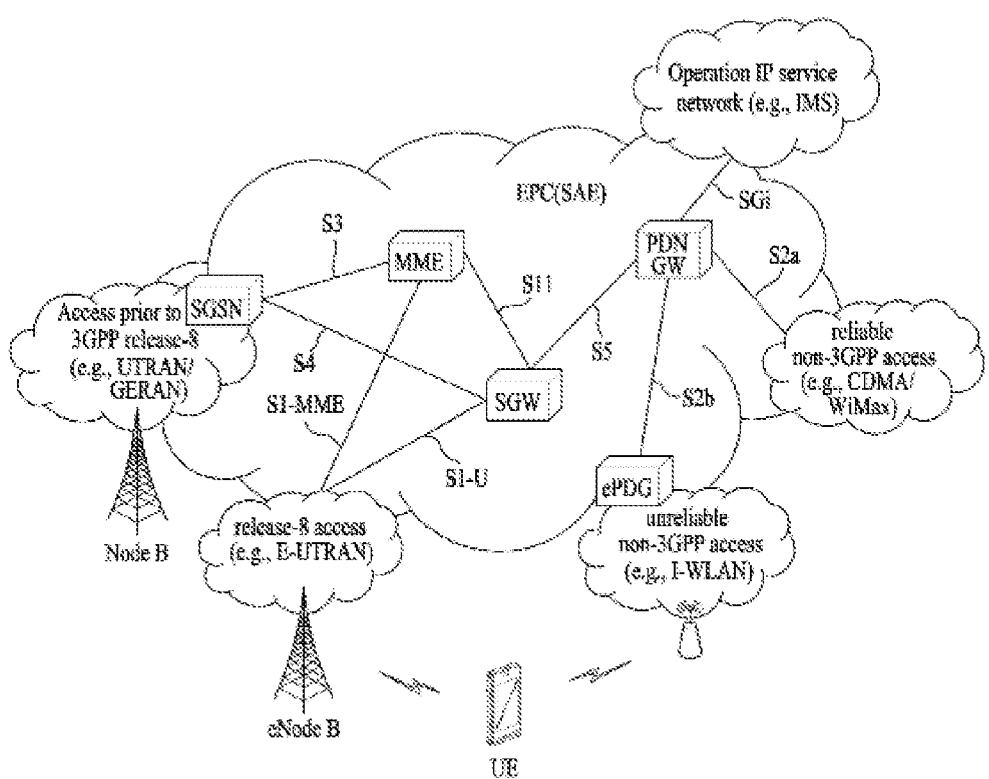
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
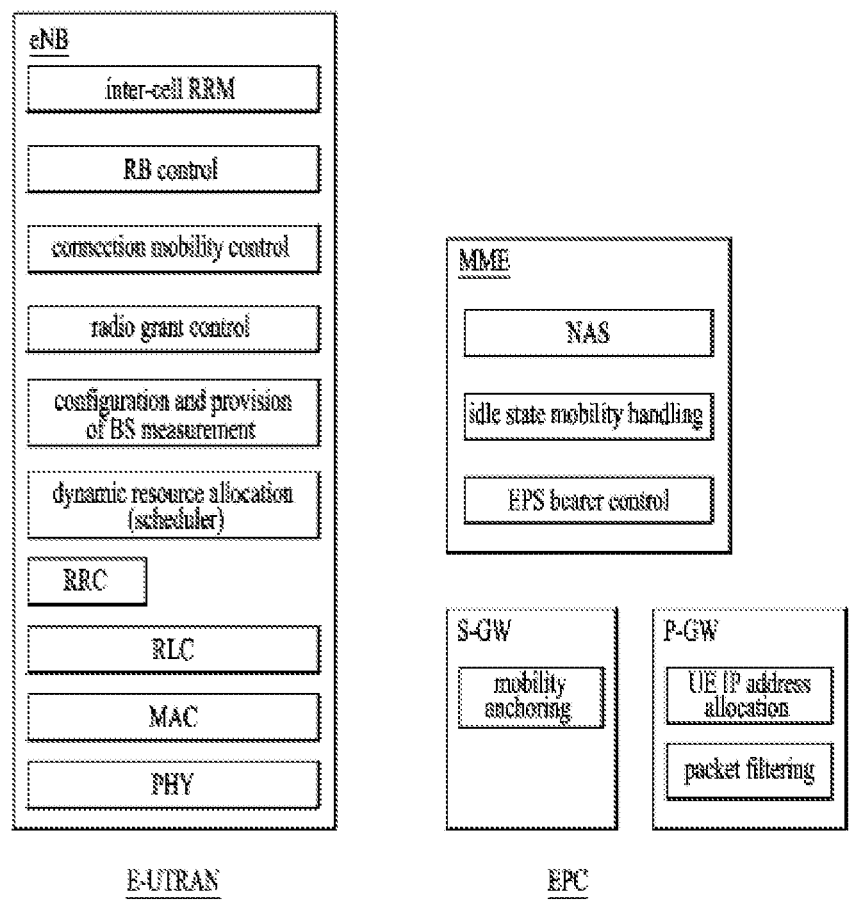
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
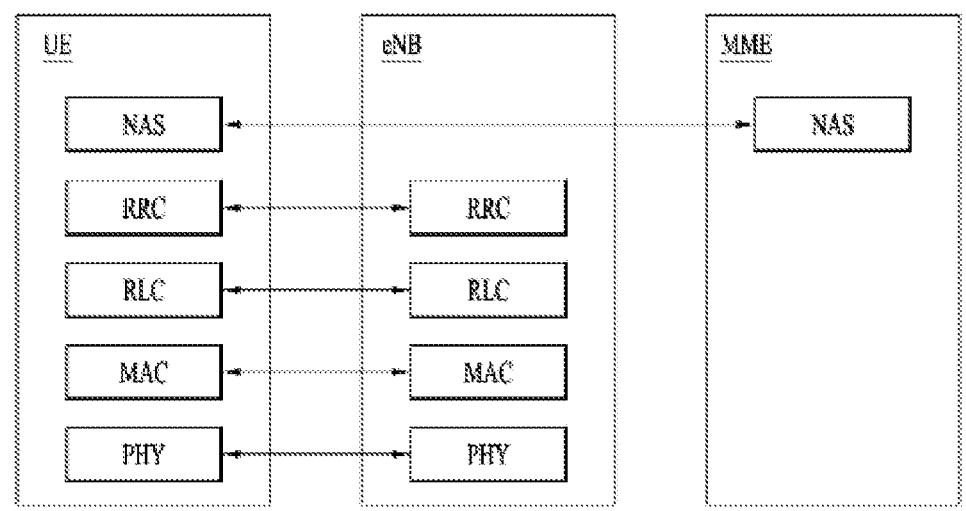
FIG. 3 is a diagram illustrating the structure of a radio interface protocol in a control plane.
Figure 4:
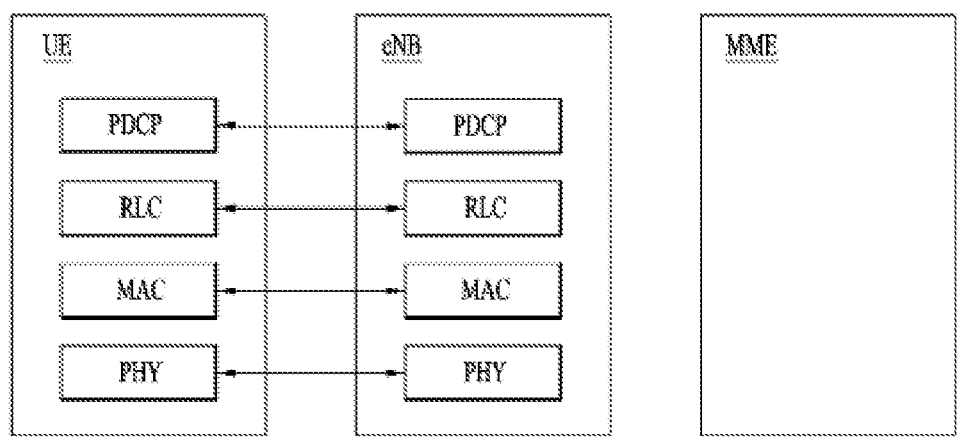
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
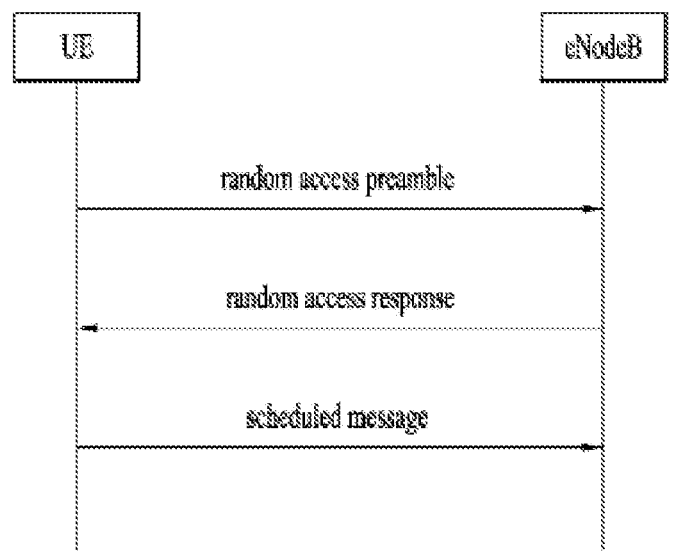
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
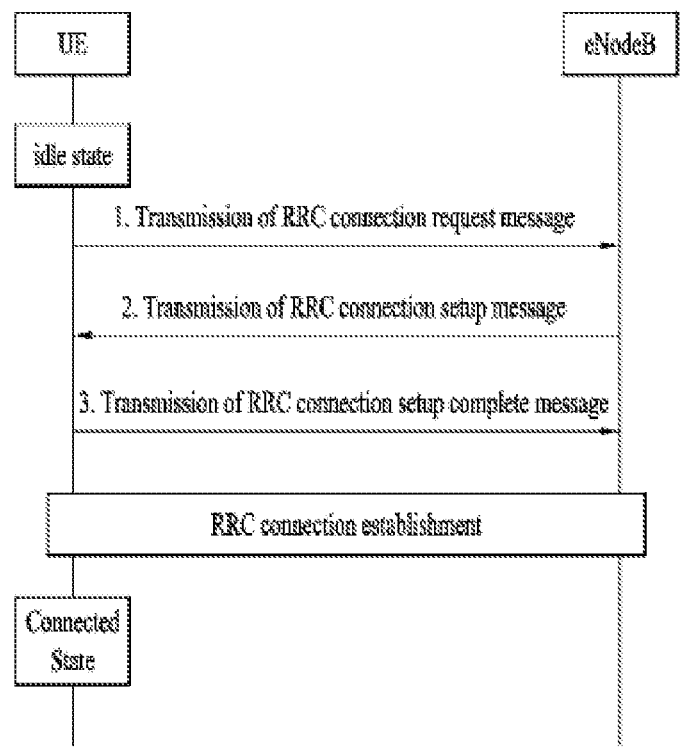
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
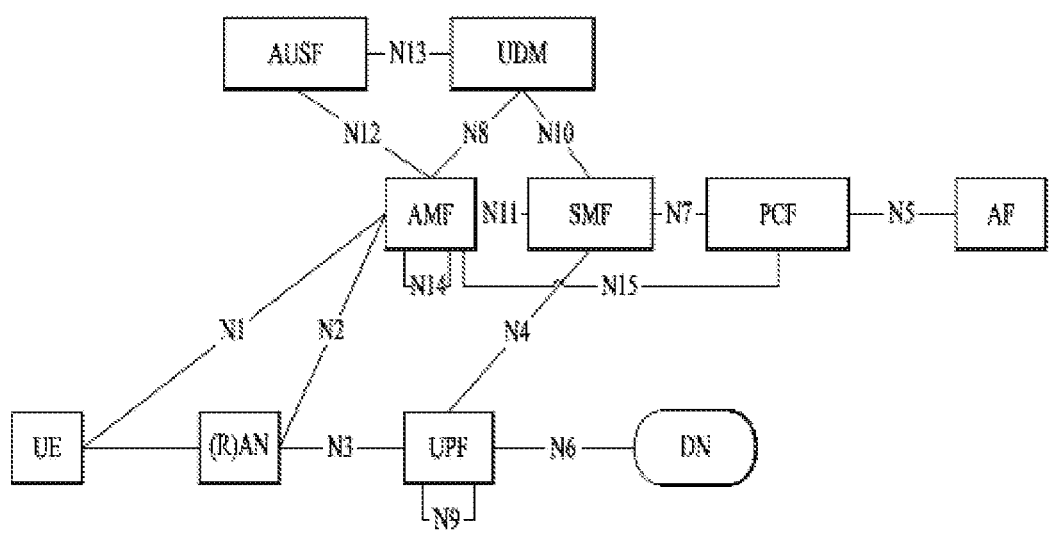
FIG. 7 is a diagram illustrating a 5th generation (5G) system.

In a next generation system (i.e., 5G core network (CN)), the functionality of an MME in the legacy EPC may be divided into a Core Access and Mobility Management Function (AMF) and a Session Management Function (SMF). The AMF is in charge of NAS interaction with the UE and mobility management (MM), and the SMF is in charge of session management (SM). In addition, the SMF manages a user plane function (UPF), which corresponds to a gateway for routing user traffic, i.e., managing a user plane. This may be interpreted to mean that the SMF manages the control plane of an S-GW and a P-GW in the legacy EPC and the UPF manages the user plane thereof. For user traffic routing, at least one UPF may exist between a RAN and a data network (DN). In other words, the legacy EPC may be implemented in the 5G system as illustrated in FIG. 7. The 5G system defines a protocol data unit (PDU) session as a concept related to a PDN connection in the legacy EPS. The PDU session refers to association between the UE and the DN that provides PDU connectivity services and may be divided into a PDU session of IP type, a PDU session of Ethernet type, and a PDU session of unstructured type. Unified data management (UDM) serves as an HSS of the EPC, and a policy control function (PCF) serves as a PCRF of the EPC. To satisfy the requirements of the 5G system, these functions may be extended and provided. Details of the 5G system architecture, individual functions, and individual interfaces may be found in TS 23.501.

Figure 8:
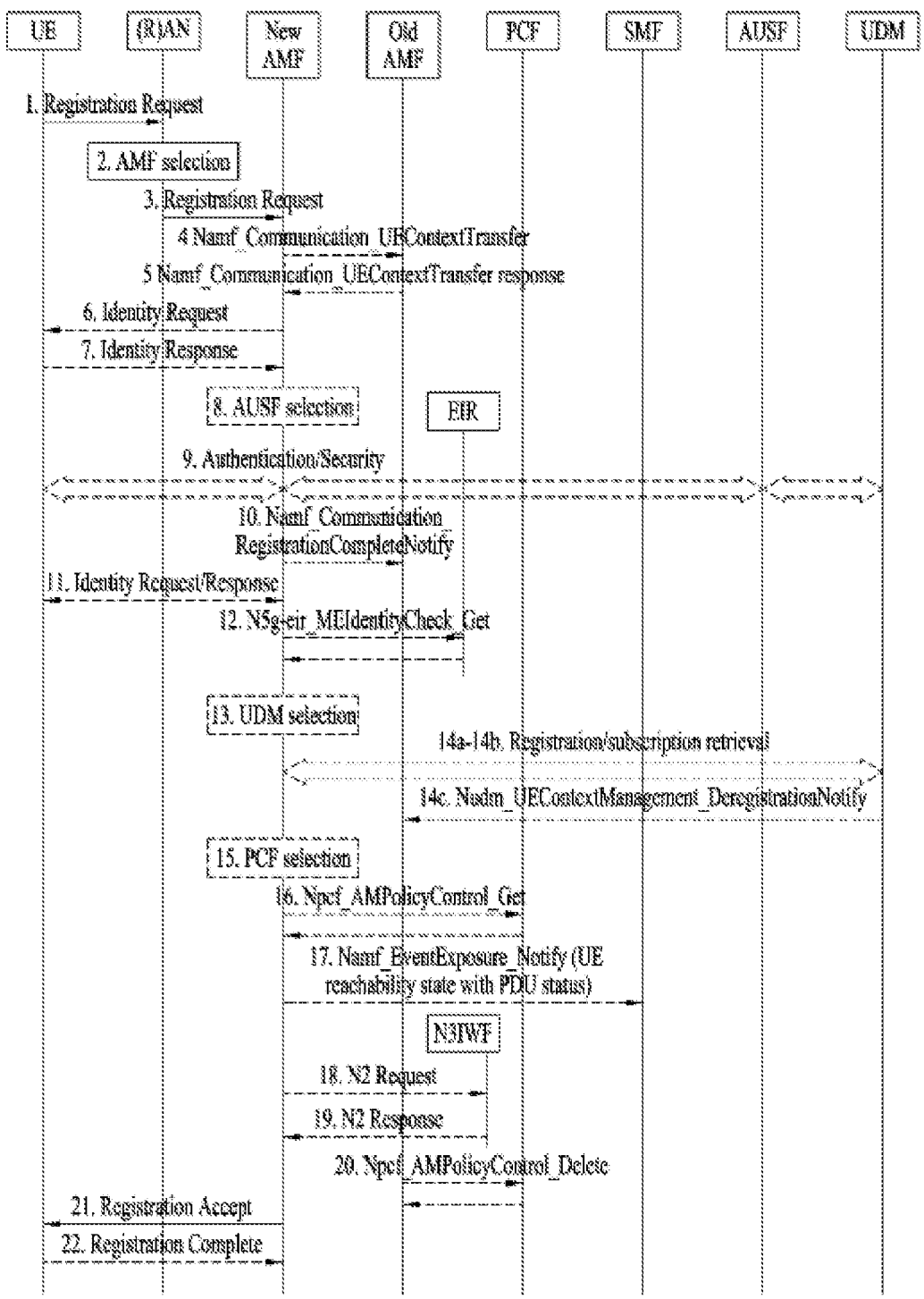
FIG. 8 is a diagram illustrating a general registration procedure in the 5G system.

FIG. 8 illustrates a general registration procedure in the 5G system. The general registration procedure may be initiated when a UE transmits a registration request to an (R)AN. Details of each step may be found in clause 4.2.2.2.2 of TS 23.502. During Registration Accept transmission of step 21 in the registration procedure, an AMF may inform the UE whether IMS voice over PS (i.e., a voice service based on packet switching) is supported within a registration area through IMS voice over PS Session Supported Indication. Specifically, the AMF configures the IMS voice over PS Session Supported Indication as described in clause 5.16.3.2 of TS 23.501. To configure the IMS voice over PS Session Supported Indication, the AMF may need to check the radio capabilities of the UE and RAN, which are related to the IMS voice over PS, by performing a UE/RAN Radio Information and Compatibility Request procedure described in clause 4.2.8 of TS 23.502. If the AMF has not received a voice support match indicator from a next generation radio access network (NG-RAN), the AMF may configure the IMS voice over PS Session Supported Indication and then update the IMS voice over PS Session Supported Indication in a next step based on implementation.

The Registration Accept transmission of step 21 will be described in detail. To configure the IMS voice over PS Session Supported Indication, the AMF may check the compatibility between the UE and RAN radio capabilities related to the IMS voice by performing the UE/RAN Radio Information and Compatibility Request procedure (see clause 4.2.8 of TS 23.502) or a UE Capability Match Request procedure towards the NG-RAN. For example, when the NG-RAN provides the IMS voice in the TDD mode, if the UE is capable of using the IMS voice only in the FDD mode, the NG-RAN may inform the AMF that the voice support thereof does not match with that for the UE (using a parameter such as the voice support match indicator).

When the AMF receives from the NG-RAN information indicating that the voice support thereof does not match with that for the UE, that is, the IMS voice related capability of the UE does not match with that of the NG-RAN, the AMF may inform the UE that the IMS voice is not supported using a Registration Accept message. How the UE operates when being informed that the IMS voice is not supported may be found in clause 5.16.3.5 (Domain selection for UE originating sessions/calls) of TS 23.501. If the UE is informed that the IMS voice is supported, the UE may use the IMS voice after IMS registration.

As described above, the AMF provides information on whether the UE is capable of using the IMS voice in the registration area. However, when no IMS voice is supported in the registration area (for example, when radio features are not suitable for voice), the UE may be informed that the IMS voice is not available. However, according to clause 5.16.3.2 (IMS voice over PS Session Supported Indication) of TS 23.501, when the network is incapable of successfully providing the IMS voice over PS session over the NR connected to a 5G core network (5GC), if one of the following operations is enabled:

- an E-UTRA connected to the 5GC supports voice and the NG-RAN is capable of triggering handover (HO) to the E-UTRA connected to the 5GC at QoS flow establishment for voice; or
- the UE supports HO to the EPS, the EPS supports voice, and the NG-RAN is capable of triggering the HO to the EPS at QoS flow establishment for voice, A serving PLMN AMF may inform the UE that the IMS voice over PS session is supported.

That is, when the UE is camping on the NR system (i.e., gNB), if the NR system (or gNB) does not support the IMS voice but is capable of handing over the UE to the E-UTRA connected to the 5GC (i.e., ng-eNB) or the EPS in order to provide the IMS voice, the NR system (or gNB) may inform the UE that the IMS voice is supported.

In this case, to configure the IMS Voice over PS session supported Indication, the AMF may check the compatibility between the UE and RAN radio capabilities related to the IMS voice by performing the UE/RAN Radio information and Compatibility Request procedure or UE Capability Match Request procedure towards the NG-RAN (gNBs and/or ng-eNBs). However, in the above operation, if the NG-RAN does not actually support the IMS voice, the following problems may occur. That is, the NG-RAN may not check the IMS voice related capability of the UE (as a result, the NG-RAN may provide the AMF no response regarding the voice support match) or inform the AMF that the voice support thereof does not match with that for the UE.

In addition, when the NG-RAN provides the AMF no response regarding the voice support match, the AMF may autonomously determine that the IMS voice is supported and inform the UE that the IMS voice is supported. When there is a voice call, if the UE is fallen back to the EPS or another radio access technology (RAT) in the 5GC, the voice call may not be supported since the UE and RAN capabilities are not compatible with each other in terms of the voice support, whereby user experience may be degraded. When the NG-RAN informs the AMF that the voice support thereof does not match with that for the UE, the AMF may inform the UE that the IMS voice is not supported. The voice-centric UE may move to a system capable of supporting the voice (e.g., EPS) (Details thereof may be found in clause 5.16.3.5 (Domain selection for UE originating sessions/calls) of TS 23.501). As a result, in this case, even though the UE may be served with high quality of data services in a 5G system (5GS) in usual and use the EPS or a RAT capable of supporting voice services in the 5GC when there is a voice call, the UE may not be provided with the services in the 5GS. Hereinafter, a method of solving such a problem will be described.

Embodiments

Figure 9:
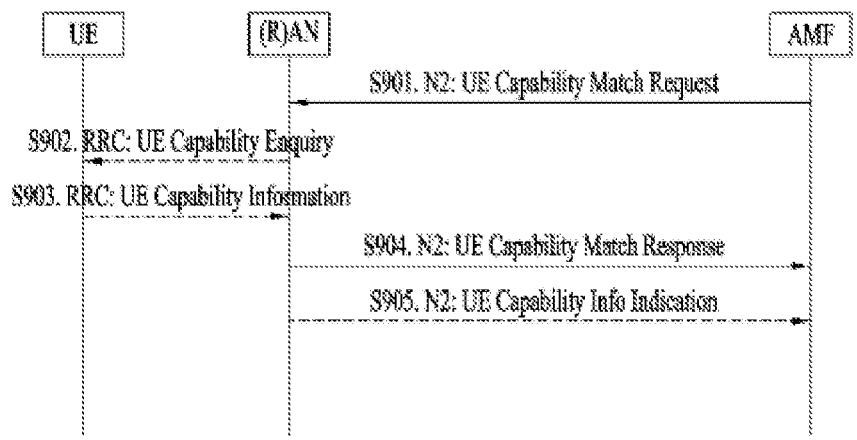
FIGS. 9 and 10 are diagrams for explaining procedures for checking UE capability and a network configuration according to embodiments of the present disclosure.

With reference to FIG. 9, an embodiment of the present disclosure will be described. Referring to FIG. 9, an NG-RAN (i.e., an (R)AN of FIG. 9) may receive a request for UE capability related to IMS voice (UE Capability Match Request) from an AMF (S901). That is, the AMF may inform whether the AMF desires to receive a voice support match indicator. The request may include UE radio capability information, which is previously received from the NG-RAN, or the registration area of a UE. In addition, when transmitting the UE Capability Match Request to the NG-RAN, the AMF may include information on EPS fallback or information on RAT fallback. This may be interpreted to mean that the AMF provides an EPS fallback indication or a RAT fallback indication to the NG-RAN since it is configured in the core network that the IMS voice is provided by the EPS fallback or the RAT fallback.

The NG-RAN may check whether the UE capability is compatible with a network configuration.

The network configuration, of which the compatibility with the UE capability is checked by the NG-RAN, may include a network configuration of the NG-RAN and a network configuration of a network node capable of the IMS voice even though the NG-RAN does not support the IMS voice. That is, according to the present disclosure, it may be checked whether the network configuration of the network node capable of the IMS voice is compatible with the UE capability in terms of the IMS voice even though the NG-RAN does not support the IMS voice, compared to a conventional compatibility check for checking whether the network configuration of the NG-RAN is compatible with the UE capability in terms of the IMS voice.

Even though the NG-RAN does not support the IMS voice, the IMS voice may be enabled as follows: when there is a voice call for the UE, the UE may be handed over or redirected to an EPS so that the UE is capable of using the IMS voice. This may mean that the NG-RAN is configured to support the EPS fallback for the IMS voice. In other words, when the NG-RAN is configured to support the EPS fallback for the IMS voice, it may mean that when there is a voice call for the UE, the NG-RAN hands over or redirects the UE to the EPS so that the UE is capable of using the IMS voice. The related operation may be found in clause 4.13.6.1 (EPS fallback for IMS voice) of TS 23.502. In this case, the network node capable of the IMS voice is a network node available as an EPS fallback target. For example, an eNB may be used as the network node capable of the IMS voice.

Even though the NG-RAN does not support the IMS voice, the IMS voice may be enabled as follows: when there is a voice call for the UE, the UE may be handed over or redirected to an NG-RAN supporting the IMS voice so that the UE is capable of using the IMS voice. This may mean that the NG-RAN is configured to support the RAT fallback for the IMS voice. In other words, when the NG-RAN is configured to support the RAT fallback for the IMS voice, it may mean that when there is a voice call for the UE, the NG-RAN (e.g., gNB) hands over or redirects the UE to the NG-RAN supporting the IMS voice (e.g., ng-eNB) so that the UE is capable of using the IMS voice. The related operation may be found in clause 4.13.6.2 (Inter RAT Fallback in 5GC for IMS voice) of TS 23.502. In this case, the network node capable of the IMS voice is a network node available as an RAT fallback target. For example, an ng-eNB may be used as the network node capable of the IMS voice.

In summary, when the NG-RAN is configured to support the EPS or RAT fallback for the IMS voice although it does not supports the IMS voice, the NG-RAN may check whether the UE radio capabilities related to voice services (i.e., IMS voice) are compatible with the configuration of the target network node (or whether the UE supports certain capabilities required for Voice continuity of voice calls using IMS PS), using information on the configuration of the network node available as the ESP or RAT fallback target (it may refer to an EPS/E-UTRAN/eNB or a 5GS/NG-RAN/ng-eNB/gNB). This may mean that the NG-RAN checks the compatibility with respect to the voice services for the UE in consideration of the EPS fallback or RAT fallback.

When determining the network node available as the EPS or RAT fallback target, the NG-RAN may use configured information (e.g., information configured according to an O&M method) or the registration area of the UE if it is provided by the AMF in step S901. The NG-RAN may be configured to support the EPS or RAT fallback for the IMS voice. Alternatively, the NG-RAN may check the compatibility with respect to the voice services for the UE based on the EPS fallback indication or RAT fallback indication provided by the AMF in step S901.

When the NG-RAN does not support the IMS voice, the network configuration of the network node capable of the IMS voice may be obtained in one of the following ways: the network configuration may be configured in the NG-RAN; the network configuration may be obtained when the NG-RAN sets up an interface with the network node; and the network configuration may be obtained when the NG-RAN requests the network node. Specifically, the following methods may be considered: I) the network configuration may be configured in the NG-RAN (for example, based on the O&M method), II) the NG-RAN may obtain the network configuration when the NG-RAN sets up an interface with a candidate network node (normally, during a deployment) and exchanges network configuration information related to voice services, or III) the NG-RAN may obtain the network configuration by sending a request therefor to a candidate network node. It is assumed that there is an interface therebetween. In this case, the NG-RAN may request the network configuration related to the voice services and obtain information thereon only. In addition, the NG-RAN may obtain the network configuration information for another UE and store the obtained network configuration information. The NG-RAN may use the stored network configuration information.

To determine proper UE Radio Capability Match Response, the NG-RAN may be configured by its operator to check whether a specific capability is supported for voice continuity of voice calls using the IMS voice. In a common network, the NG-RAN may maintain a configuration separately for each PLMN. A check that should be performed may depend on the network configuration. For example, the following may be considered:

UTRAN/E-UTRAN/NG-RAN Voice over PS capabilities;
The Radio capabilities for UTRAN/E-UTRAN/NG-RAN FDD and/or TDD; and/or
The support of UTRAN/E-UTRAN/NG-RAN frequency bands.

To ensure the voice service continuity of voice calls initiated by the IMS, the NG-RAN provides the AMF the voice support match indicator indicating whether the UE capabilities are compatible with the network configuration. In this case, the NG-RAN may explicitly or implicitly inform that its network configuration is not related to the voice support match information, which is provided by the NG-RAN to the AMF. Additionally or alternatively, the NG-RAN may explicitly or implicitly inform that the voice support match information is related to the network configuration of an eNB (connected to the EPC) or the network configuration of an ng-eNB (connected to the 5GC). Additionally or alternatively, the NG-RAN may explicitly or implicitly inform that the voice support match information is related to EPS fallback or RAT fallback. The AMF may store the received voice support match indicator in 5GMM contexts and use it as an input for configuring the IMS voice over PS Session Supported Indication.

In steps S902 and S903, the NG-RAN may perform a procedure for checking the UE capability towards the UE. This procedure may be performed before the aforementioned check procedure of the NG-RAN. However, the procedure may not be necessarily performed before the check procedure, and it may be omitted.

When the NG-RAN receives a UE Capability Match Request message in step S901, if the NG-RAN does not receive the UE radio capabilities from the UE or AMF in step 901, the NG-RAN requests to update UE radio capability information in step S902. The UE provides UE radio capabilities sending the RRC UE Capability Information to the NG-RAN (S903).

In step S904, the NG-RAN may transmit, to the AMF, a response including the result of checking whether the UE capability is compatible with the network configuration.

The AMF may perform the UE Capability Match Request procedure in the following cases in addition to the cases described in clause 4.2.8a of TS 23.502.

a) A case in which the IMS voice is supported by 5G QoS Flow that supports voice in an area covered by the previous serving AMF of the UE but the IMS voice is not supported in an area covered by the corresponding AMF (this may mean that the IMS voice is supported by the EPS or RAT fallback).

b) A case opposite to a)

c) A case in which the IMS voice is supported by 5G QoS Flow that supports voice in a previous registration area of the UE but the IME voice is not supported in an registration area provided/to be provided to the UE (this may mean that the IMS voice is supported by the EPS or RAT fallback).

d) A case opposite to c)

As described above, when the NG-RAN checks the capability, the following problems may be solved. First, the NG-RAN does not check the IMS voice related capability of the UE and as a result, the NG-RAN provides the AMF no response regarding the voice support match. Second, the NG-RAN responds to the AMF that the voice support thereof does not match with that for the UE. Third, when the NG-RAN provides the AMF no response regarding the voice support match, the AMF may autonomously determine that the IMS voice is supported. When there is a voice call, if the UE is fallen back to the EPS or another RAT in the 5GC, the voice call may not be supported since the UE and RAN capabilities are not compatible with each other in terms of the voice support. Last, when the NG-RAN responds to the AMF that the voice support thereof does not match with that for the UE, the voice-centric UE may move to a system capable of supporting the voice (e.g., EPS) As a result, in this case, even though the UE may be served with high quality of data services in the 5GS in usual and use the EPS or a RAT capable of supporting voice services in the 5GC when there is a voice call, the UE may not be provided with the services in the 5GS.

Figure 10:
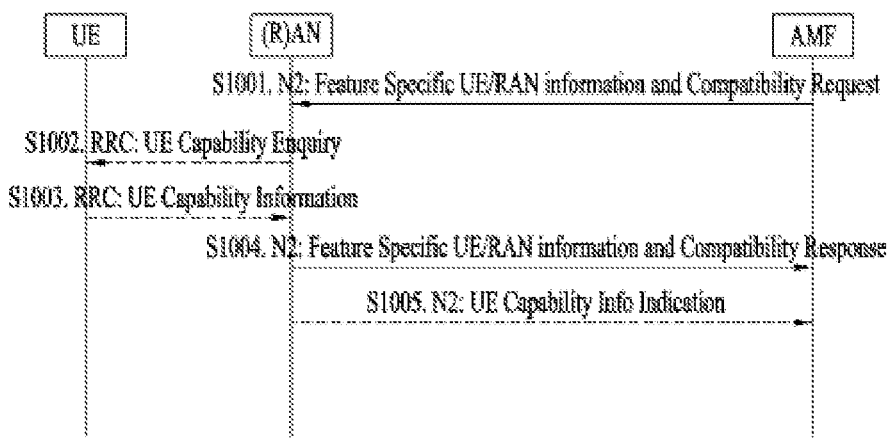

Although FIG. 10 is similar to FIG. 9, they are different in that FIG. 10 shows an example in which an AMF transmits to an NG-RAN (i.e., an (R)AN of FIG. 10) Feature Specific UE/RAN Information and Compatibility Request. Although messages have different names, the basic principles are the same as described in FIG. 9. Thus, the following details are applicable to FIG. 9 unless they collide with those of FIG. 9. In addition, the details of FIG. 9 are applicable to FIG. 10 unless the details collide with those of FIG. 10.

In step S1001, when transmitting the Feature Specific UE/RAN Information and Compatibility Request to the RAN, the AMF may contain the registration area of a UE. The AMF may include the registration area at all times or when sending the request in order to request the RAN to send RAN-related information about voice services.

In step S1004, if the RAN that receives the Feature Specific UE/RAN Information and Compatibility Request in step S1001 is a gNB and the gNB (here, the gNB may be interpreted as a cell thereof) does not support the IMS voice but is capable of handing over the UE to an E-UTRA (here, the E-UTRA may be connected to the 5GC or mean an EPS connected to the 5GC), the gNB (i.e., the NG-RAN) may operate as follows to provide a response to the AMF.

1) The gNB checks whether the UE radio capabilities related to voice services (i.e., IMS voice) are compatible with the network configuration of a candidate eNB(s) to which the UE may be handed over to receive the voice services. This may be interpreted to mean that the gNB does not check whether the UE radio capabilities related to the voice services (i.e., IMS voice) is compatible with its network configuration. When there are multiple candidate eNBs, the gNB may determine that the voice support thereof matches with that of the UE if the network configurations of all eNBs are compatible with the UE radio capabilities related to the voice services.

The candidate eNB(s) to which the UE may be handed over to receive the voice services may be configured in the gNB (for example, based on the O&M method) or may be derived based on the registration area of the UE if the AMF provides the registration area of the UE in step S1001. The eNB may be an ng-eNB connected to the 5GC or an eNB connected to the EPC. In the present disclosure, both the ng-eNB connected to the 5GC and the eNB connected to the EPC are commonly called the eNB. The gNB may obtain the network configuration of the candidate eNB(s), which is related to the voice services, in the same way as described in FIG. 9.

The operation mentioned in 1) may be performed after the Feature Specific UE/RAN Information and Compatibility Request is received from the AMF in step S1001 or before the Feature Specific UE/RAN Information and Compatibility Request is transmitted to the AMF in step S1004. In addition to the operation in 1), when the gNB transmits Feature Specific UE/RAN Information and Compatibility Response to the AMF, the gNB may implicitly or explicitly inform that the voice support match information is not related to its network configuration. Additionally or alternatively, the gNB may implicitly or explicitly inform that the voice support match information is related to the network configuration of an eNB (connected to the EPC) or the network configuration of an ng-eNB (connected to the 5GC).

Referring again to FIG. 9, according to another embodiment, when 5G QoS Flow that supports IMS voice is not successfully supported, the AMF may not perform the UE Capability Match Request procedure towards the NG-RAN in step 901.

Figure 11:
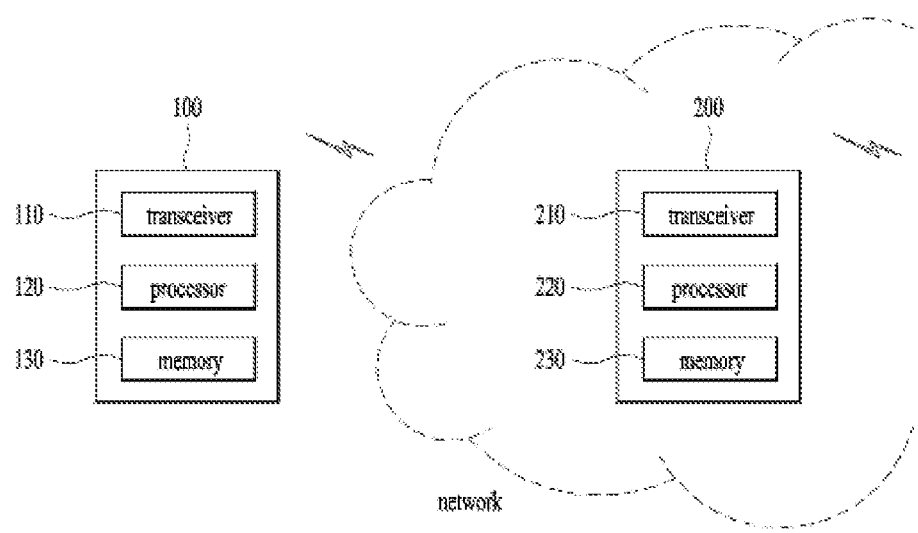
FIG. 11 is a diagram illustrating the configurations of node devices according to embodiments of the present disclosure.

FIG. 11 illustrates the configurations of a UE device and a network node device according to embodiments of the present disclosure.

Referring to FIG. 11, the network node device 200 may include a transceiver 210, a processor 220, and a memory 230. The transceiver 210 may be configured to transmit and receive various signals, data, and information to and from an external device. The network node device 200 may be connected to the external device by wire and/or wirelessly. The processor 220 may be configured to control the overall operations of the network node device 200 and process information exchanged between the network node device 200 and external device. The memory 230 may be configured to store the processed information for a predetermined time and replaced with a component such as a buffer (not shown in the drawing). In addition, the processor 220 may be configured to perform the network node operations proposed in the present disclosure.

Specifically, a processor of an NG-RAN device may be configured to control a transceiver to receive a request for the capability of a UE related to IMS voice from an AMF, check whether the capability of the UE is compatible with a network configuration, and control the transceiver to transmit a response including the result of the checking to the AMF. The network configuration may include the network configuration of the NG-RAN and the network configuration of a network node capable of the IMS voice even though the NG-RAN does not support the IMS voice.

In addition, a processor of an AMF device is configured to control a transceiver to transmit a request for the capability of a UE related to IMS voice to an NG-RAN and control the transceiver to receive, from the NG-RAN, a response including the result of checking whether the capability of the UE is compatible with a network configuration. The network configuration may include the network configuration of the NG-RAN and the network configuration of a network node capable of the IMS voice even though the NG-RAN does not support the IMS voice.

Continuing to refer to FIG. 11, the UE device 100 according to the present disclosure may include a transceiver 110, a processor 120, and a memory 130. The transceiver 110 may be configured to transmit and receive various signals, data, and information to and from an external device. The UE device 100 may be connected to the external device by wire and/or wirelessly. The processor 120 may be configured to control the overall operations of the UE device 100 and process information exchanged between the UE device 100 and the external device. The memory 130 may be configured to store the processed information for a predetermined time and replaced with a component such as a buffer (not shown in the drawing). In addition, the processor 120 may be configured to perform the UE operations proposed in the present disclosure.

Regarding the configurations of the UE device 100 and the network device 200, the above-described various embodiments of the present disclosure may be applied independently, or two or more embodiments of the present disclosure may be applied at the same time. Redundant description has been omitted for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A method performed by a first base station in a wireless communication system, the method comprising:
   receiving, by the first base station from an access and mobility management function (AMF), a request message for capability of a user equipment (UE) related to Internet protocol (IP) multimedia subsystem (IMS) voice;
   checking, by the first base station, whether the capability of the UE is compatible with at least one network configuration to identify that the first base station does not support the IMS voice and that a network configuration of a second base station is compatible with the capability of the UE; and
   transmitting, by the first base station to the AMF, a response message indicating that the capability of the UE is compatible with the at least one network configuration,
   wherein the at least one network configuration includes a first network configuration of the first base station and a second network configuration of the second base station capable of the IMS voice.

2. The method of claim 1, wherein, even though the first base station does not support the IMS voice, the IMS voice is enabled as follows: the UE is handed over or redirected to an evolved packet system (EPS) in occurrence of a voice call so that the UE uses the IMS voice.

3. The method of claim 2, wherein the second base station capable of the IMS voice is a network node available as an EPS fallback target.

4. The method of claim 3, wherein the network node available as the evolved packet system (EPS) fallback target comprises an evolved Node B (eNB).

5. The method of claim 2, wherein the first base station is configured to support evolved packet system, EPS, fallback for the IMS voice.

6. The method of claim 1, wherein, even though the first base station does not support the IMS voice, the IMS voice is enabled as follows: the UE is handed over or redirected to a next generation radio access network (NG-RAN) supporting the IMS voice in occurrence of a voice call so that the UE uses the IMS voice.

7. The method of claim 6, wherein the second base station capable of the IMS voice is a network node available as a radio access technology (RAT) fallback target.

8. The method of claim 7, wherein the network node available as the RAT fallback target comprises a next generation evolved node B (ng-eNB).

9. The method of claim 6, wherein the first base station is configured to support radio access technology (RAT) fallback for the IMS voice.

10. The method of claim 1, further comprising:
    obtaining the second network configuration during setting up an interface with the second base station.

11. The method of 1, wherein the first base station obtains the second network configuration of the second base station capable of the IMS voice even though the first base station does not support the IMS voice in one of the following ways: the second network configuration is configured in the first base station; the first base station obtains the second network configuration while setting up an interface with the second base station; and the first base station obtains the second network configuration by sending a request for the second network configuration to the second base station.

12. A first base station configured to operate in a wireless communication system, the first base station comprising:
    a transceiver; and
    a processor coupled to the transceiver and configured to:
    receive, from an access and mobility management function (AMF), a request message for capability of a user equipment (UE) related to Internet protocol (IP) multimedia subsystem (IMS) voice;
    check whether the capability of the UE is compatible with at least one network configuration to identify that the first base station does not support the IMS voice and that a network configuration of a second base station is compatible with the capability of the UE; and
    transmit, to the AMF, a response message indicating that the capability of the UE is compatible with the at least one network configuration,
    wherein the at least one network configuration includes a first network configuration of the first base station and a second network configuration of the second base station capable of the IMS voice.

13. An access and mobility management function (AMF) device configured to operate in a wireless communication system, the AMF device comprising:
    a transceiver; and
    a processor coupled to the transceiver and configured to:
    transmit, to a first base station, a request message for capability of a user equipment (UE) related to Internet protocol (IP) multimedia subsystem (IMS) voice; and
    receive, from the first base station, a response message indicating that the capability of the UE is compatible with at least one network configuration,
    wherein the at least one network configuration includes a first network configuration of the first base station and a second network configuration of a second base station capable of the IMS voice even though the first base station does not support the IMS voice,
    wherein the first base station does not support the IMS voice, and
    wherein the second network configuration of a second base station is compatible with the capability of the UE.

* * * * *